July 22, 1969

S. R. SMOLEN 3,457,120

CORROSION PROTECTIVE DEVICE FOR
STORAGE BATTERY TERMINALS
Filed Feb. 29, 1968

INVENTOR
Sam Robert Smolen
BY
Sandoe, Neill,
Schottler & Wikstrom

ATTORNEYS.

United States Patent Office 3,457,120
Patented July 22, 1969

3,457,120
CORROSION PROTECTIVE DEVICE FOR STORAGE BATTERY TERMINALS
Sam Robert Smolen, 119 Vreeland Ave.,
Bloomingdale, N.J. 07403
Continuation-in-part of application Ser. No. 496,778, Oct. 18, 1965. This application Feb. 28, 1968, Ser. No. 709,372
Int. Cl. H01m 5/02
U.S. Cl. 136—181          5 Claims

ABSTRACT OF THE DISCLOSURE

This specification discloses an improved protector for the terminal of a lead storage battery. The protector includes an annular dish that fits closely around a terminal of the storage battery, and the outer wall of the dish is substantially higher than the inner wall. A cover fits closely within the outer wall and is supported by the inner wall so that there is a space under the cover with the space closed around the entire circumference of both walls by the cover so that liquid in the space cannot spill or surge out of the dish with sudden acceleration or deceleration movements of the battery when in a vehicle. The cover hugs the terminal and is porous so that it serves as a wick to supply liquid to the terminal. There is a filler opening in the cover intermediate the inner and outer walls, and in the preferred construction the outer wall extends above the cover so as to provide a space on top of the cover for holding liquid if any liquid surges up from the space under the cover, that liquid is confined on top of the cover until it drains back into the space under the cover.

BACKGROUND AND BRIEF DESCRIPTION OF THE INVENTION AND RELATED APPLICATIONS

This application is a continuation-in part of my application Ser. No. 496,778, filed Oct. 18, 1965 which is now abandoned.

Lead storage batteries, using sulphuric acid in the electrolyte, have lead terminals and connectors which are subject to corrosion from the acid and acid fumes. Various means have been devised for protecting the terminals and connectors from the acid fumes but many of these devices are not effective, and the more complicated ones cannot be used on conventional batteries.

This invention provides an improved device for protecting the terminals and connectors of storage batteries from acid and acid fumes, and provides a device which can be applied to any conventional storage battery without requiring adaptation of any kind in either the terminal or the connector.

One of the common means for protecting batteries is to apply grease to the terminal and a number of protectors of the prior art have been containers for holding grease in contact with the terminal. I have discovered that oil is much more effective than grease, and apparently the use of a liquid has the advantage of promoting transfer of salts that form on the terminal and which promote corrosion. Whether the oil circulates, or whether the salts distribute through the oil, is uncertain, but apparently there is a circulation of oil and this may result from thermal conditions.

This invention provides an oil reservoir which fits over a battery post and which is provided with means for permitting contact of the oil with the battery post while at the same time preventing the oil from splashing or spilling when the battery is used in an automobile or boat, or other vehicle.

This invention provides a shallow dish which has a center opening that fits over a battery post, and the dish has a cover for preventing spilling of the oil but for permitting transfer of oil into contact with the surface of the post.

The invention provides an oil reservoir, of the character indicated, with a construction that does not interfere with the locating of the connector on the post above the reservoir. Experience has shown that by protecting the post below the connector, the connector itself is also protected from corrosion. This may be because connector corrosion results from acid creeping upward along the post, or it may result from the protection of the connector from acid fumes. Whatever the cause, the invention keeps the connector free of corrosion without applying any oil to the connector other than by such contact as occurs between the bottom surface of the connector and the cover of the dish.

An improved advantage of the invention is that it permits a protective liquid to be used instead of grease, and it prevents loss of the liquid as the result of surging in the space under the cover of the dish. Surging effects are unavoidable in vehicles and on boats. This invention limits any escape of liquid as the result of surging, and confines any liquid that does escape from the space under the cover by using a side wall higher than the cover to confine the liquid until it can run back by gravity. The cover is a wick and is kept saturated by surge action of the liquid in the space beneath it. This space is large enough to hold a supply of oil which will last for the life of the battery.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF THE PREFERRED EMBODIMENT

Figure 1:
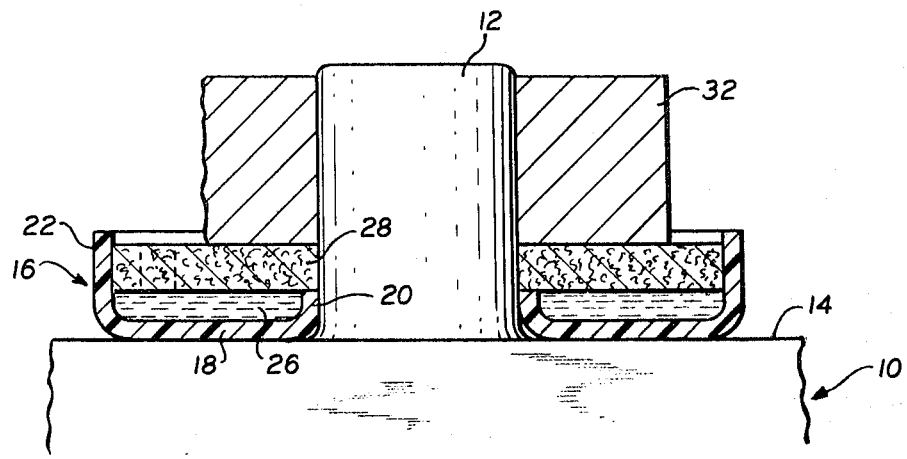
FIGURE 1 is a vertical sectional view through a battery post and connector protector made in accordance with this invention.
Figure 2:
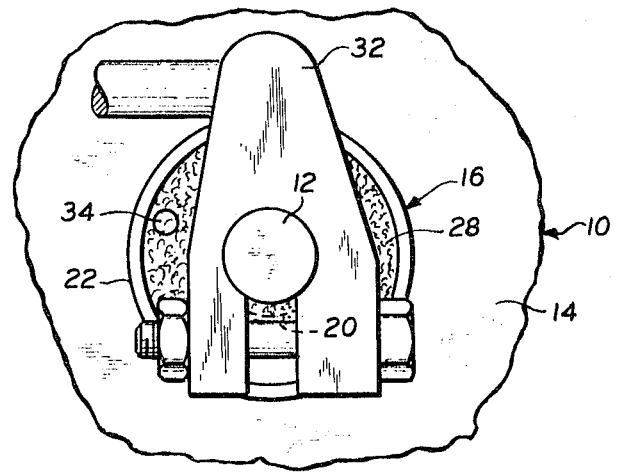
FIGURE 2 is a top plan view of the structure shown in FIGURE 1.

FIGURE 1 shows a lead storage battery 10 having a terminal post 12 extending upward from a top surface 14 of the battery.

The protector of this invention includes an annular container or dish 16 having a bottom 18 which is preferably flat, an inner wall 20 and an outer wall 22. This dish 16 is preferably made of plastic and the inner wall 20 fits snugly over the post 12.

The dish 16 can be made of material which stretches sufficiently to fit over either the positive or the negative post of a conventional storage battery, but in the preferred construction, different sizes of protectors are used for the positive and negative posts so as to avoid distortion of the dish 16 when applied to the battery. In the construction illustrated, the inner wall 20 meets the bottom wall 18 along a curved arc of juncture and the upper portion of the inner wall 20 has a short cylindrical section which grips the post 12 when the dish is originally pushed down over the post.

The dish is filled, or substantially filled, with oil 26. The kind of oil is not critical and an oil of the viscosity of SAE 20 or SAE 30 has proven highly satisfactory in practice. An annular cover 28 is placed over the dish 16 and is pushed down on the post 12 into contact with the top edge of the inner wall 20. This cover is preferably porous and it can be a felt disk of a grade which acts as a wick. Oil which splashes or surges against the felt disk 28 is picked up by capillary action of the dish and is fed into contact with the cylindrical surface of the post 12. If desired, the felt disk can be soaked in oil before being placed on the dish 16, but this is not necessary.

The outer wall 22 is preferably higher than the inner wall 20 so as to provide a wall around the outer periphery of the annular cover or disk 28. This upward extension of the outer wall above the cover 28 provides space in which liquid can stand when and if any liquid escapes between the side of the cover and the outside wall or upward through the opening 34 as the result of strong surge action in the liquid space under the cover.

It is desirable that the inner wall 20 be low, so as to leave ample length of the terminal 12 free for receiving a clamp 32 which connects the battery with the electrical system in which the battery is used. The outer wall 22 need not be as low, because the battery clamp 32 becomes somewhat higher as it extends away from the battery post 12. It is a feature of the construction of this invention that the dish 16 does not interfere with the positioning or orientation of the clamp 32, and the dish 16 does not have need of any special configuration in order to provide clearance where the clamp 32 passes across the outer wall 22.

Under ordinary service conditions, this invention can be filled with oil when originally installed on the battery and will protect the terminal 12 for the life of the battery. When used with batteries that are confined in closed compartments, or with batteries of extremely long life spans, the supply of oil 26 can be renewed on occasions by pouring a small quantity of oil through an opening 34 in the disk 28. This opening 34 also provides a means for determining the amount of oil in the dish 16. A match or other dip-stick can be inserted through the opening 34 to determine the depth of oil.

The opening 34 has a diameter approximately equal to or less than the thickness of the disk 28. Thus oil cannot splash out of the opening 34 as a result of motion or vibration of a vehicle in which the battery is used. Oil splashing or surging into the opening 34 will soak into the material forming the sides of the opening. The opening 34 is purposely spaced radially inward from the outside wall 22 so as to reduce the effect of a surge action which would otherwise cause liquid to rise along the inside of the wall 22 when a surge approached the part of the wall where the opening in the cover was located.

When the invention is made with a disk 28 which is thin and easily flexed, the opening 34 can be omitted and oil can be placed in the dish 16 by lifting the disk 28 along one edge.

The preferred embodiment of the invention has been illustrated and described, but changes and modifications can be made and some features can be used in different combinations without departing from the invention as defined in the claims.

What is claimed is:

1. A corrosion protective device for storage batteries including an annular dish having an inner side wall of a diameter to fit closely around a terminal of a battery which is to be protected, an outer side wall higher than the inner side wall, both of the walls being low as compared to the height of the battery terminal with which the device is intended to be used so as to leave most of the height of the battery terminal unobstructed for receiving a clamp of an electric cable, and an annular cover with its inner edge portion in position for contact with the battery terminal, the cover having a substantially flat bottom surface and being supported by the inner wall and bridging the space in the lower part of the dish between the walls, to leave unobstructed space for liquid oil under the cover, the bottom of the dish defining the bottom of said space, the cover being of porous, oil-absorbent material and extending to the inside of the outer wall around the full circumferential extent of the outer wall to prevent oil from splashing or surging out of the space within the lower part of the dish when the device is used on a battery in a motor vehicle.

2. The corrosion protective device described in claim 1 characterized by the dish being made of flexible corrosion resistant material and the cover being an annular disk made of felt which is impregnated with oil and which is subjected to further contact with oil as the result of oil splashing against the bottom of the cover from the space which is bridged by said cover.

3. The corrosion protective device described in claim 2 characterized by the cover having an opening therethrough at a location spaced radially from both the inner and outer walls of the dish for measuring the amount of liquid in the dish and for adding liquid when necessary.

4. The corrosion protective device described in claim 1 characterized by the cover being an annular disk of a porosity to wick #30 oil.

5. The corrosion protective device described in claim 3 characterized by the outer wall being higher than the inner wall by a distance greater than the thickness of the cover, whereby any liquid oil that surges upward around the edges of the cover is confined in a puddle on top of the cover and flows back through the opening in the cover to the space in the dish below the bottom of the cover.

References Cited

UNITED STATES PATENTS 1,858,383    5/1932    Anderson.

FOREIGN PATENTS 993,725    11/1951    France.
81,201    7/1963    France.
           (Addition to No. 1,253,309.)

WINSTON A. DOUGLAS, Primary Examiner

D. L. WALTON, Assistant Examiner

U.S. Cl. X.R.

136—163